(12) United States Patent
Nguyen

(10) Patent No.: US 7,783,987 B2
(45) Date of Patent: Aug. 24, 2010

(54) USER EXPERIENCE ENFORCEMENT

(75) Inventor: Vu X. Nguyen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/903,439

(22) Filed: Jul. 30, 2004

(65) Prior Publication Data

US 2006/0026284 A1    Feb. 2, 2006

(51) Int. Cl.
*G06F 3/048* (2006.01)
(52) U.S. Cl. .................. 715/780; 715/700; 715/760; 715/829
(58) Field of Classification Search .......... 715/741, 715/742, 743, 744, 505–508, 700, 760, 780, 715/829
See application file for complete search history.

(56) References Cited

U.S. PATENT DOCUMENTS

| 6,223,292 | B1 * | 4/2001 | Dean et al. ............... 726/28 |
| 6,952,714 | B2 * | 10/2005 | Peart .................... 709/203 |
| 2002/0108109 | A1 * | 8/2002 | Harris et al. ............. 725/32 |
| 2003/0206193 | A1 * | 11/2003 | Sato et al. .............. 345/736 |
| 2005/0055412 | A1 * | 3/2005 | Kaminsky et al. ......... 709/207 |
| 2005/0102610 | A1 * | 5/2005 | Jie ....................... 715/513 |
| 2006/0149833 | A1 * | 7/2006 | Dan et al. ............... 709/218 |
| 2007/0011336 | A1 * | 1/2007 | Jarrad et al. ............ 709/227 |

FOREIGN PATENT DOCUMENTS

JP    2002-196788    *    7/2002

* cited by examiner

*Primary Examiner*—Simon Ke
(74) *Attorney, Agent, or Firm*—Woodcock Washburn LLP

(57) ABSTRACT

In order to provide for efficient security of a remote presentation (such as a remote display) on a client which presents user interface data from a remote server, all requests for action to be performed on the client are examined to determine if they are requests for user interface (UI) presentation. If the request is for UI presentation, it is verified to ensure that the request is valid—e.g., that it comes from an approved source. If the request is a valid UI request, then the request is served. If a UI request cannot be verified, the request is served, if possible, without presenting the user interface data from the request—e.g., by hiding visual data, or playing audio data at zero or minimal volume. Otherwise, the request is not serviced and the connection from the client to the server may be terminated.

21 Claims, 5 Drawing Sheets

USER EXPERIENCE ENFORCEMENT

FIELD OF THE INVENTION

This invention relates to the remote provision of media and related media services from one computing device to a remote computing device. More particularly, the invention relates to the protection of presentation of user interface data on a remote computing device.

BACKGROUND OF THE INVENTION

Remote computing gives a computing system the capability to serve operating system-based applications from the computing system to remote devices. FIG. 1 generally illustrates how remote computing operates between a server and a client device. Server 10 and client device 20 (sometimes called an "endpoint") communicate over any network connection 30, whether wired or wireless. In one embodiment, this "remoting" communication is provided through a specific protocol, such as Microsoft Corporation's Remote Desktop Protocol (RDP) or another protocol, running over a connection, such as Transmission Control Protocol (TCP), utilizing Microsoft Corporation's Terminal Services to manage the connection. The connection in this embodiment maybe referred to as the RDP connection. Microsoft Corporation's Terminal Services creates a virtual environment that represents all resource needed to present user interface data to a client device 20 and process user input from the client device 20. This virtual environment is also known as session 11.

When using RDP and Terminal Services, in order for display information to be displayed on the client device 20, on the server 10 RDP uses its own video driver to render the display output by constructing the rendering information into network packets using RDP protocol. These packets are then sent over the network connection 30 to the client device 20. On the client, RDP receives rendering data and interprets the packets into corresponding graphics device interface API calls. For the input path, client mouse and keyboard events are redirected from the client to the server.

Thus, more generally, application 15 executes on the server 10 in a session 11. User interface data 40, representing data to be presented on client device 20 in connection with session 11 representing application 15, is transmitted to the client device 20. This user interface data 40 can include media data (e.g. a recorded video presentation) and/or user control data (e.g. a menu for controlling a recorded video presentation).

Further more a session 11 can represent the set of applications that will be present on the client device 20. For any Server 10, there can be multiple sessions presenting user interface data to client devices. In this embodiment, the session which represents the set of user experience to be rendered on the client is managed by the server; however, one can imagine an embodiment in which this management is done on the client.

The user interface data 40 is then rendered or displayed, e.g., on display 25 on client device 20. While a display is discussed and shown in FIG. 1, any presentation of a user interface, e.g. by visual or audio displays or otherwise, may be used.

The user of client device 20 who is viewing a menu, for example, displayed as part of user interface data 40, can respond (e.g. in order to perform operations in connection with server 10 as if the application 15 were running locally). This is done via input 45 to client device 20 respecting application 15, which is transmitted back to server 10.

The input 45 is received by the remote computing server software on the server 10, and the operation is performed on server 10 on behalf of client device 20, possibly changing the user interface data 40 which is to be displayed or otherwise presented on client device 20.

In this way, the user input helps control the transmission and presentation of the user interface data 40. As discussed above, media data is transmitted and presented as part of the user interface data 40 on client device 20. The user interface data 40 presented on client device 20 creates what is termed a media experience. The media experience unifies the different information (e.g. media data providing, e.g., video and audio displays, and user control data to control the presentation of media data) presented on client device 20. Thus, for example, menus used to control different types of media data may be coordinated in order to increase usability and the general aesthetic appeal of the media experience.

Multiple media experiences can each be instantiated and received by respective endpoint client devices. Each media experience is controlled by at least one server. User interfaces data presented on client device 20 can include graphics that typically compose a user control interface. Other non-graphical control data may also be presented, e.g. audio data dealing with user control. In order to control the media experience, typical actions that a remote user may desire to carry out via the user interfaces include commands over media data, such as stop, fast forward, and rewind. In addition, the user may be provided with controls to perform conventional computer commands to enable actions such as resizing replay windows, adjusting volume, and adjusting picture quality. User input may be provided via, e.g., a keyboard connected to the client device 20, via a remote associated with client device 20, or via any other input means.

As discussed, media data is also presented as part of a media experience. Media data consists of presentation data for presentation on the client device 20. The following is a nonexhaustive list of exemplary media data which may be included in a media experience: a streaming media presentation, including video and/or audio presentation(s), a television program, including a cable television (CATV), satellite, pay-per-view, or broadcast program, a digitally compressed media experience, a radio program, a recorded media event (sourced by a VCR, DVD player, CD player, personal video recorder or the like), a real-time media event, a camera feed, etc. The media data may be in any format or of any type which can be presented on client device 20, such as music (formatted as MP3s, WMVs, etc.), streaming audio/video, photos (formatted as JPEGS, GIFs, etc.), movie files (formatted as MOVs, MPEG, etc.), advertisements, broadcast media (radio, TV, cable, etc.), graphics data, etc.

Thus, a user with local PC located in a home office could use that PC to watch a streaming video program from the Internet on a television (a first remote endpoint device) in the family room. Moreover, using the same PC, a second user could simultaneously watch on another television set (a second remote endpoint device presenting second media experience) a video stored on the local PC. It is noted that these scenarios can be further extended to a myriad of circumstances. For instance, a third user could simultaneously observe a camera feed inputted into local PC that is remoted to a third remote endpoint device. A fourth user could use local PC to remote a fourth instantiation of a media experience to watch a remoted television program on a monitor (also an endpoint device) that does not include a TV tuner.

Because, as discussed above, the media experience is intended to enable a simple, rich user interface that integrates media data along with the user control functionality necessary to control the media data presentation, it is important that the media experience be protected from unauthorized presentations of user interface data. Such unauthorized presentations may be derived from an attack by a hacker or other adversary, attempting to interfere with or preempt all or part of the media experience, either via the server 10 or via the network connection 30. Additionally, such unauthorized presentations may be a result of rogue software on server 10. While the software application(s) which are intended to control the presentation of the media experience on the client device 20 can be programmed to function to provide the media experience according to some predetermined plan, providing the aforementioned simple, rich user interface, there may be other software on server 10 which attempts to provide user interface data 40 for display on the client device 20. Where such displays do not conform to the unified media experience intended, this will interfere with the aforementioned goals for consistency, usability and aesthetic appeal of the media experience.

Generally, where remoting is not being performed, one method in which unauthorized processes can be prevented from performing unauthorized activity is to examine each process and verify that it is authorized. One such verification technique is to have authorized applications be verifiable through a digital signature. Thus, for example, before a process is allowed to perform an activity, the image of the executable associated with the process is examined to determine if it is digitally signed by an acceptable authority. Only if it is so signed is the process allowed to perform the activity. Alternatively, when the determination is made that a process is not properly signed, that process may be terminated.

However, using this technique to prevent unauthorized activity on a remote client device session 11 presents several disadvantages. Firstly, the server 10 may not include the processing power to analyze every process and determine whether it is verifiable. If many processes produce traffic which is detected by the server 10, this may cause performance problems. Secondly, where the technique requires that unverifiable processes be terminated, and where it is possible to allow each remote client device session 11 to terminate processes, permitting them to do so may lead to instability if verification in a remote client devices session 11 terminates processes as unauthorized which are used by the server 10 under some alternate policy.

It would thus be desirable to have a technique to restrict the presentation of user interface data on a remote device to authorized processes, while overcoming drawbacks such as those described above. The present invention addresses the aforementioned needs and solves them with additional advantages as expressed herein.

SUMMARY OF THE INVENTION

The invention allows for the enforcement of the integrity of the media experience without the drawbacks described above.

In order to provide for efficient security of a remote presentation (such as a remote display) on a client which presents user interface data from a remote server, all requests for actions that are to be performed on the client are examined to determine if they are requests for user interface presentation. If the request is a request for user interface presentation, it is verified to ensure that the request is valid. For example, the request may be analyzed to verify that it comes from an approved source. This verification may be achieved by cryptographic techniques such as digital signatures. If the request is a user interface request which is verifiable, then the request is served. If the request is a user interface request which cannot be verified, the request is served, if possible, without presenting the user interface data from the request. For example, visual data may be hidden and audio data may be played at zero or minimal volume. Otherwise, the request is not serviced and the connection from the client to the server is, in one embodiment, terminated.

Thus, according to one embodiment, a request is generated by the server for performing an action. If the request is a user interface presentation request, its validity is determined. If the request can be determined to be valid, then the user interface data from the request is transmitted to the client's computer for presentation on the client, e.g., for rendering on the video display or speakers.

Additionally, a module on the client may also provide verification of the client to the server. The client is verified by some means such that the interface 40 between server and client should not be compromised. Securing this connections should be familiar to someone with prior knowledge in the field of cryptography.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 2:
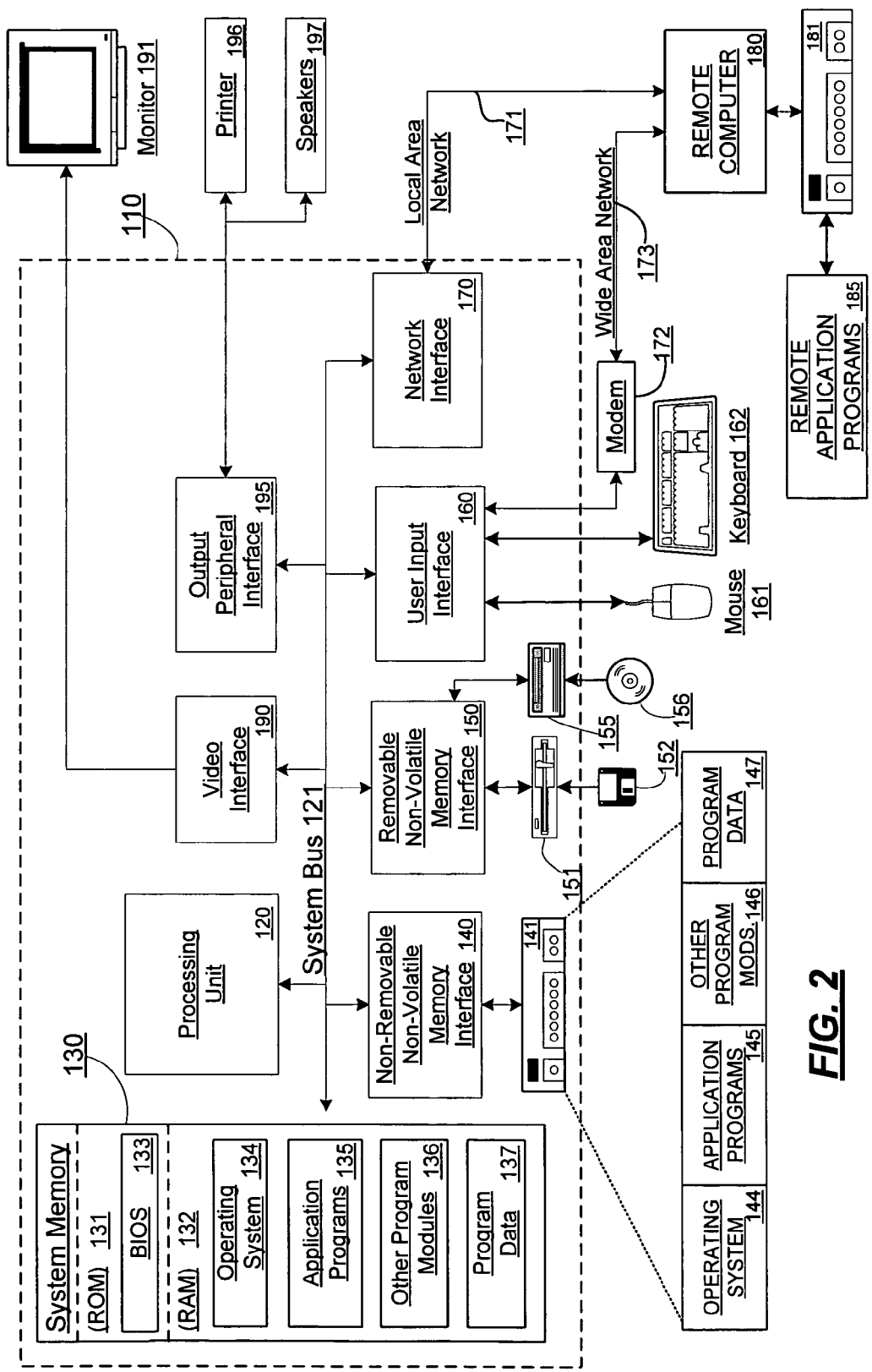
FIG. 2 is a block diagram of an exemplary computing environment in which aspects of the invention may be implemented.

FIG. 2 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer system 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

User Experience Enforcement

Figure 3:
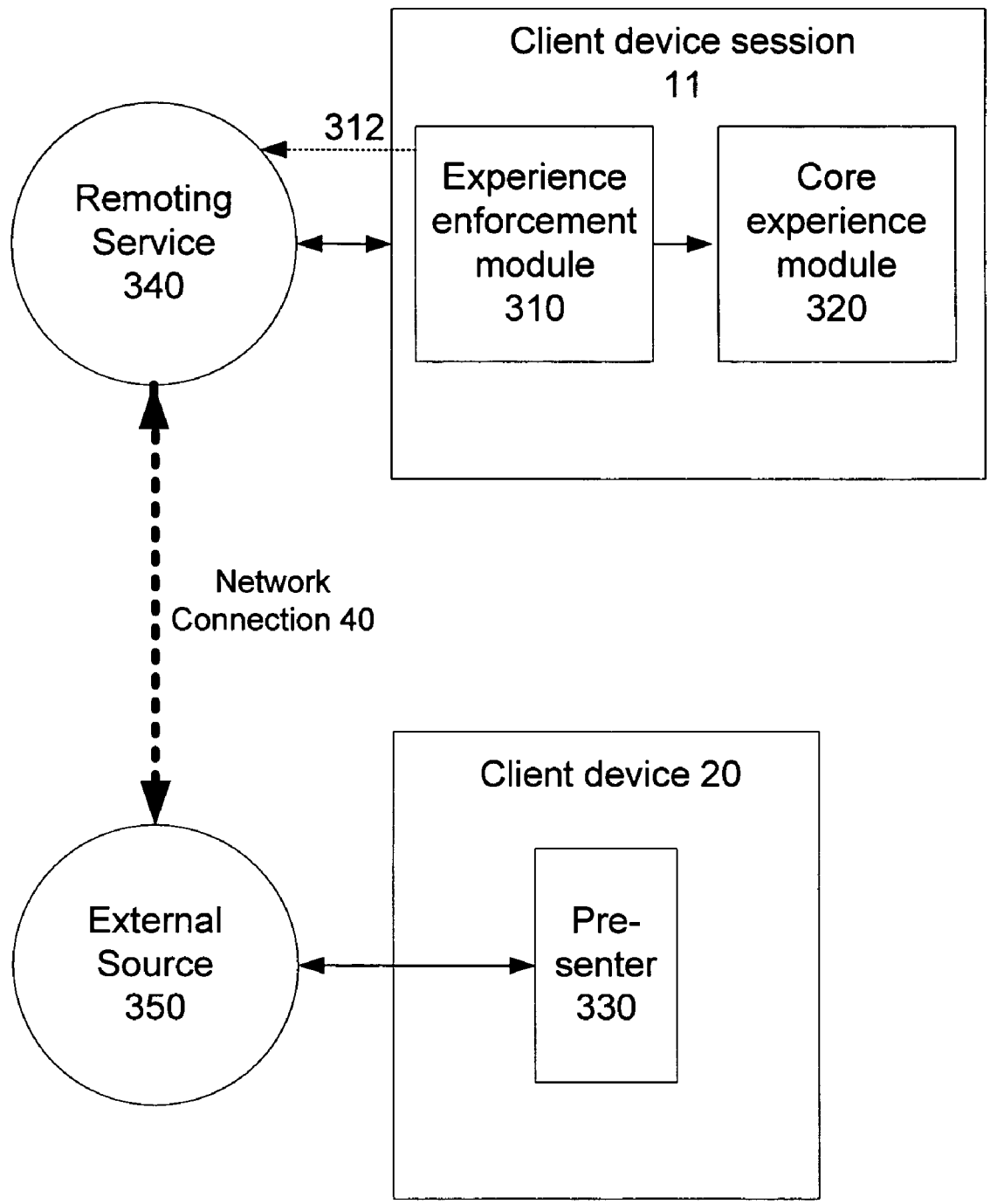
FIG. 3 is a block diagram of a client device according to one embodiment of the present invention.

FIG. 3 is a block diagram of a client device session 11 according to one embodiment of the present invention. According to one embodiment, in order to enforce a user experience for presentation on the client device, an experience enforcement module 310 is included in the client device session 11. Client device session 11 preferably exists on the server as a virtualized session that represents the data to be rendered on the actual client device. The experience enforcement module 310 handles presentation data managed by the client device session 11. In one exemplary embodiment, remoting service 340 is a source connected to the client device 20 via a RDP connection as described above; however, this invention is not limited to use with such a RDP connection or Microsoft Corporation's Terminal Services for the remoting service. (Remoting service 340 exists on the server side, and its counterpart on the client side is external source 350. External source 350 is the connection to the host and represents the data to and from the server. This data include presentation data as well as user input data. In an example embodiment, external source 350 is the object that implements the remote desktop protocol (RDP), and it send that data appropriately to client for handling.)

For all activity received from the remoting service 340 sent to the session 11, the experience enforcement module 310 determines whether any incoming process calls for a user interface activity. That is, the experience enforcement module 310 determines whether the process indicates an activity which is attempting to present data to the user, that is, whether it is a user interface (UI) process 15. This may be done in a variety of ways. In a system which is running according to some varieties of Microsoft Corporation's Windows operating system, the applications programming interface (API) can provide information regarding whether the process is a UI process.

Figure 1:
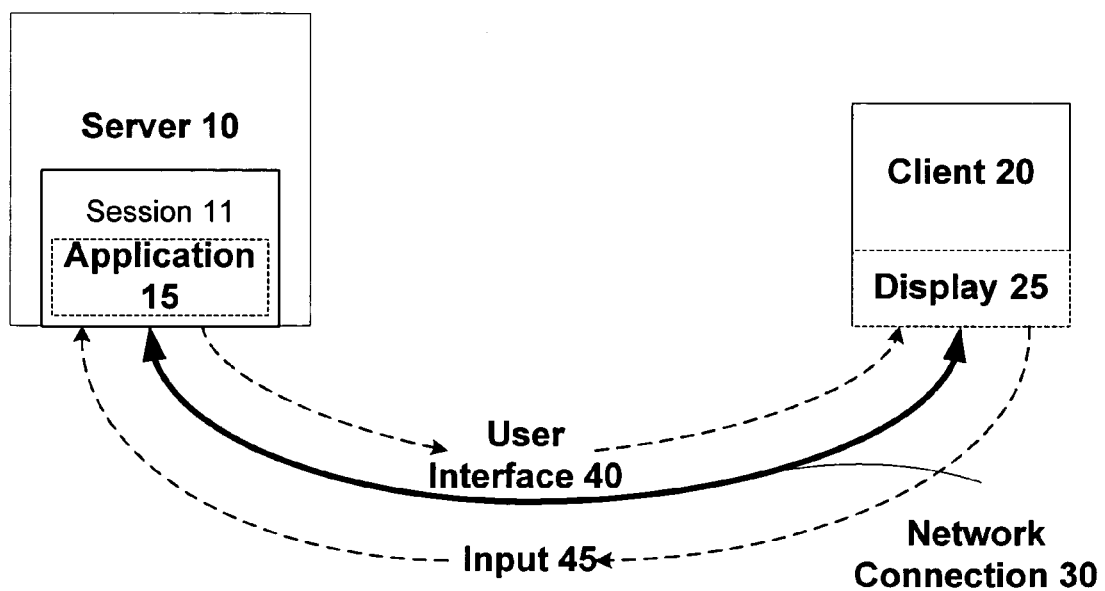
FIG. 1 is a block diagram illustrating remote computing with a server and a client device.

If the incoming process is attempting to present data to the user represented by the session 11, a check of the UI process 15 (e.g., application 15 shown in FIG. 1) is performed in order to verify that that process is valid for the experience which is to be presented on client device 20 by core experience module 320. This check may also be performed before the experience enforcement module 310 has determined that the process is a UI process.

If the process is a UI process and is valid for the experience, the presentation of data is allowed to proceed. The UI data which is the subject of the request is passed to the remoting service 340 via the session to client device 20. The UI data is then handled by the Presenter 330. Presenter 330 actually presents the data to the user, e.g. by displaying it on a monitor or other visual display device or playing it on audio speakers associated with the client device 20.

According to one embodiment, if the process is not valid for the experience, the data presentation requested by the process is suppressed. If the process is requesting visual data be presented on client device 20, suppressing the visual data is accomplished, if possible, by generating instructions that would cause presenter 330 at the client to close, hide, or move the presentation. For example, a window to be displayed on presenter 330 according to a process which is not valid for the experience may be minimized, moved behind an existing valid window (e.g. using z-order layering), or moved off of the screen. An audio presentation to be played according to a process which is invalid for the experience may be suppressed by reducing the volume of the playback. Alternate types of data to be presented on client device 20 may be suppressed in other, similar ways. Such suppression allows the process to continue functioning normally, without an indication that the suppression has occurred.

It may be, however, that such suppression of the data to be presented by an invalid process is not possible. For example, the suppression of a window to be displayed by a process may call for the window to be placed in the background, overlapped completely by a window from a valid process. However, if the process attempts to foreground the window, such foregrounding should not be allowed to occur. In such cases, or in any other cases where the user interface data from the invalid UI process does not admit to being suppressed, the session with the external source 350 is terminated and restarted.

Validation of the Process

In order to validate the process, it is contemplated that any software authentication technique, including cryptographic techniques, may be used. In one embodiment, at the initiation of the core experience module 320 and the experience enforcement module 310, a trusted chain of software is verified which ensures that the experience enforcement module 310 can be trusted to validate processes for the session from the operating system and distinguish valid processes from ones that are not verifiable. Once the chain of trust is established, the binary signature for a process attempting to provide user interface data is examined. If it is verified and valid for the experience, then the presentation of the user interface data is allowed to proceed. If not, then the presentation of the data suppressed. In one embodiment, if such suppression is not possible, the session connecting the client device 20 is terminated and restarted. In an alternate embodiment, when a certain number of such terminations occur, the session connecting the client device 20 is ended and not restarted.

Generally, the core experience module 320 contains information regarding valid processes which should be allowed to present user interface data for the session. The experience enforcement module 310 additionally receives information regarding which processes are to be considered valid for the experience. Such information is provided by the server operating system. The information should be received in a manner which is verifiable by the experience enforcement module 310. In one embodiment, the chain of trusted software, once verified, can be used to receive information about valid processes which can present UI to the experience. This information includes a list of valid processes for presenting UI to the experience, and may be updated as processes are created or removed from the list of valid processes.

According to one embodiment, the experience enforcement module 320 also participates in a verification process for the remoting service. Periodically, the experience enforcement provides verification information to the remoting service by sending experience verification information to the service, shown as arrow 312. This experience verification information, in one embodiment, includes a signed image of the core experience module 320. The remoting source 340 can use this information to verify that the experience enforcement module 310 has not been compromised. In such an embodiment, if the remoting service 340 does not receive correct experience verification information from the experience enforcement module 310, or if no information is received within a certain period of time, the remoting service 340 terminates communications with the client 20.

Methods of Presenting User Interface Data

Figure 4:
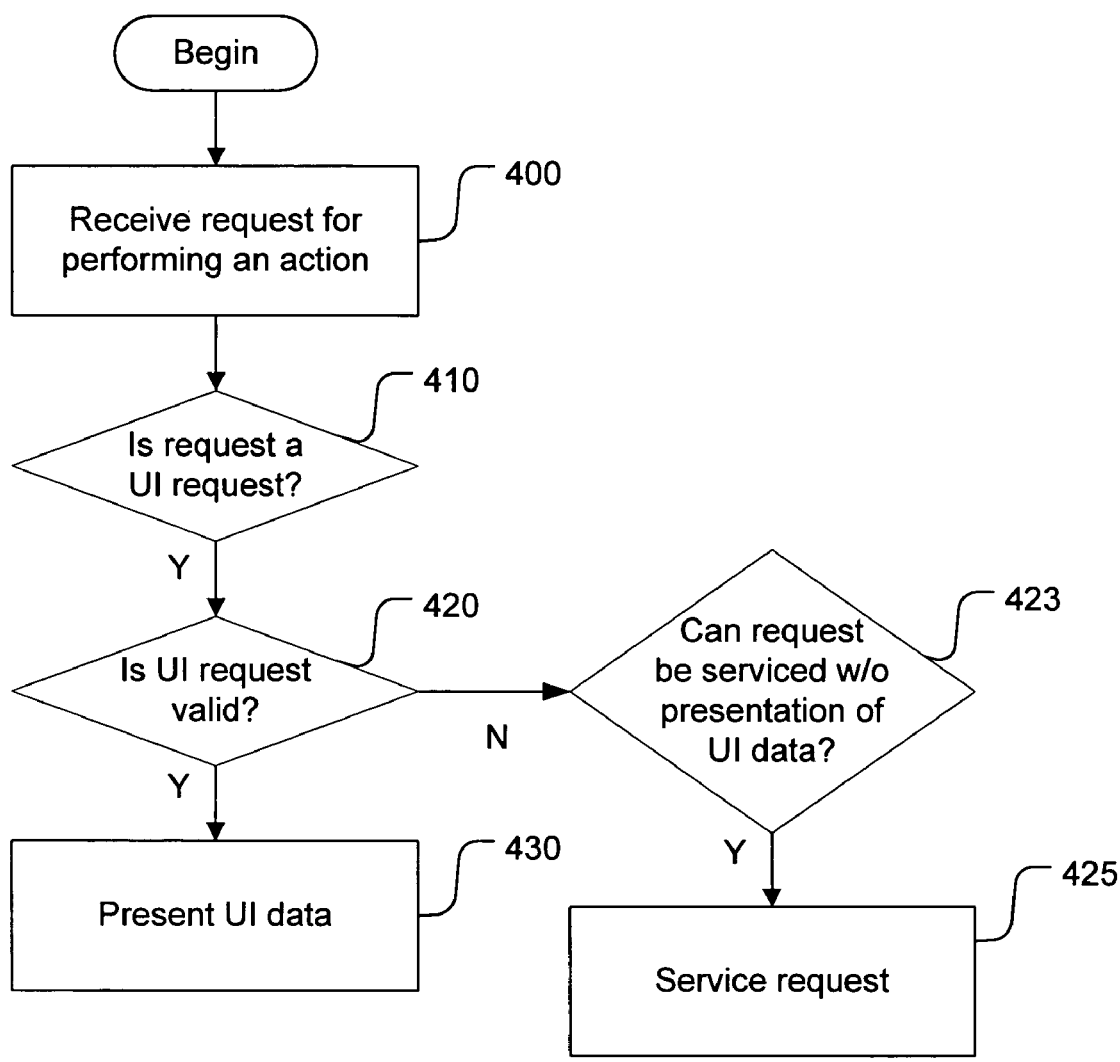
FIG. 4 is a flow diagram of a method for presenting user interface data received via a connection from a source according to one embodiment of the invention.

FIG. 4 is a flow diagram of a method for presenting user interface data according to one embodiment of the invention. As shown in FIG. 4, step 400, first, a request is received for performing an action. A determination is made as to whether said request is a user interface presentation request, decision step 410. If it is, the validity of the request is determined, decision step 420. If the request is a valid user interface presentation request, the user interface data is presented 430. In one embodiment, presenting the user interface data means that the data that represents instructions to presenter 330 (shown in FIG. 3) are delivered to the client.

In one embodiment, if the request is not valid, then it is determined whether the request can be serviced without presenting user interface data, decision step 423. If the request can be serviced without presenting user interface data, step 425, then it is serviced without presenting user interface data. This may be done, for example, by sending instructions to the client that cause the display area to be minimized or hidden underneath other display data, or, for audio UI data, sending instructions that cause the audio to be played at a minimal or zero volume. If the request cannot be serviced without presenting the user interface data, then it is not serviced.

Figure 5:
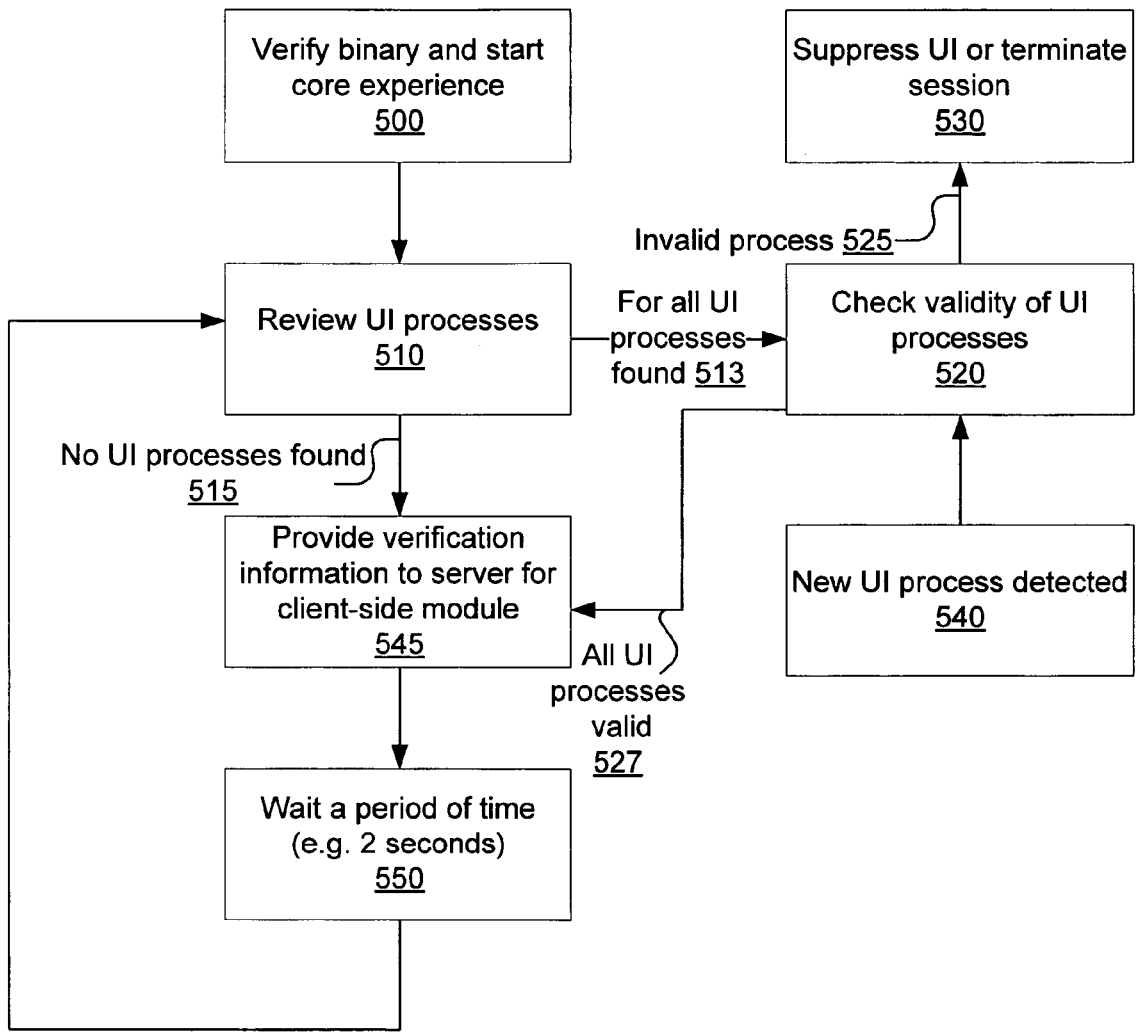
FIG. 5 is a flow diagram of a method for presenting user interface data received via a connection from a source according to one embodiment of the invention.

FIG. 5 is a flow diagram of a method for presenting user interface data received via a connection from a source according to one embodiment of the invention. As shown in FIG. 5, step 500, when a valid binary is received for the core experience module, the core experience is started. Then, in step 510, all user interface processes are reviewed. For each user interface process found 513, a check is performed of the validity of the process, step 520. For example, a runtime check may be performed of a digital signature for each executing binary implementing a user interface process to determine if the executing binary is valid to present UI. If a process is found which cannot be verified as valid, 523, then the UI is suppressed or the session providing the remote content to the client is terminated, 530. Additionally, when a new process to present UI is detected 540, the check 520 is performed to determine if the process is valid. If no UI processes are found 515 or if all UI processes are verified, then the process may be repeated periodically 550.

Optionally, verification information for a module on the client may be presented to the remote server in order to continue the connection, step 545.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those who are skilled in the art, having the benefit of the teachings of this specification, may effect numerous modifications thereto and changes may be made without departing from the scope and spirit of the invention in its aspects.

What is claimed:

1. A method for presenting user interface data received via a connection from a source, said method comprising:
   receiving a request for performing at least one action;
   determining if said request is a user interface presentation request to display a window;
   determining the validity of said request if said request is a user interface presentation request;
   presenting user interface data pursuant to said user interface presentation request if said request is a valid user interface presentation request by transmitting said user interface data from a server to a presenter that is located at said client, said presenter being operable to render said user interface data;
   sending experience validity data regarding the integrity of a module implementing said method, the experience validity data comprising a signed binary image of said module; and
   if said request is a user interface presentation request, but said request is not a valid user interface presentation request, servicing said user interface presentation request without presenting user interface data pursuant to said user interface presentation request by suppression of the user interface presentation request at the client without indicating to a user that the suppression has occurred and by reduction of a volume level of an audio presentation.

2. The method of claim 1, wherein said user interface data pursuant to said user interface presentation request is display data, and wherein said servicing of said user presentation request without presenting user interface data comprises:
   hiding a display of said user interface data underneath other presentation data.

3. The method of claim 1, wherein said user interface data pursuant to said user interface presentation request is display data, and wherein said servicing of said user presentation request without presenting user interface data comprises:
   minimizing a display of said user interface data.

4. The method of claim 1, further comprising:
   if said request is a user interface presentation request, but said request is not a valid user interface presentation request, and determining whether said request can be serviced without presenting user interface data pursuant to said user interface presentation request, and if said request cannot be serviced without presenting user interface data pursuant to said user interface, ignoring said request.

5. The method of claim 1, further comprising:
   if said request is a user interface presentation request, but said request is not a valid user interface presentation request, then determining whether said request can be serviced without presenting user interface data pursuant to said user interface presentation request, and if said request cannot be serviced without presenting user interface data pursuant to said user interface, terminating a connection to said source.

6. The method of claim 1, wherein said step of presenting user interface data pursuant to said user interface presentation request if said request is a valid user interface presentation request comprises:
   presenting visual information on a video display.

7. The method of claim 1, wherein said step of presenting user interface data pursuant to said user interface presentation request if said request is a valid user interface presentation request comprises:
   presenting audio information on an audio speaker.

8. The method of claim 1, wherein said determining the validity of said request if said request is a user interface presentation request comprises:
   storing identities of at least one specific process which can send valid user interface presentation requests; and
   determining if a request has been sent by one of said specific processes.

9. A computer readable storage medium comprising computer executable modules having computer executable instructions for presenting user interface data received via a connection from a source, said instructions for performing acts comprising:
   receiving a request for performing at least one action;
   determining if said request is a user interface presentation request;
   determining the validity of said request if said request is a user interface presentation request;
   presenting user interface data pursuant to said user interface presentation request if said request is a valid user interface presentation request by transmitting said user interface data from a server to a presenter that is located at said client, said presenter being operable to render said user interface data;
   sending experience validity data regarding the integrity of at least one of said modules, the experience validity data comprising a signed binary image of at least one of said modules; and
   if said request is a user interface presentation request, but said request is not a valid user interface presentation request, servicing said user interface presentation request without presenting user interface data pursuant to said user interface presentation request by suppression of the user interface presentation request at the client without indicating to a user that the suppression has occurred, wherein suppressing the user interface presentation request comprises reducing a volume level of an audio presentation.

10. The computer readable storage medium of claim 9, wherein said user interface data pursuant to said user interface presentation request is display data, and wherein said servicing of said user presentation request without presenting user interface data comprises:
    hiding a display of said user interface data underneath other presentation data.

11. The computer readable storage medium of claim 9, wherein said user interface data pursuant to said user interface presentation request is display data, and wherein said servicing of said user presentation request without presenting user interface data comprises:
    minimizing a display of said user interface data.

12. The computer readable storage medium of claim 9, said acts further comprising:
    if said request is a user interface presentation request, but said request is not a valid user interface presentation request, and determining whether said request can be serviced without presenting user interface data pursuant to said user interface presentation request, and if said request can not be serviced without presenting user interface data pursuant to said user interface, ignoring said request.

13. The computer readable storage medium of claim 9, said acts further comprising:
    if said request is a user interface presentation request, but said request is not a valid user interface presentation request, and determining whether said request can be serviced without presenting user interface data pursuant to said user interface presentation request, and if said request can not be serviced without presenting user interface data pursuant to said user interface, terminating a connection to said source.

14. The computer readable storage medium of claim 9, wherein said presenting user interface data pursuant to said user interface presentation request if said request is a valid user interface presentation request comprises:
    presenting visual information on a video display.

15. The computer readable storage medium of claim 9, wherein said presenting user interface data pursuant to said user interface presentation request if said request is a valid user interface presentation request comprises:
    presenting audio information on an audio speaker.

16. The computer readable storage medium of claim 9, wherein said determining the validity of said request if said request is a user interface presentation request comprises:
    storing identities of at least one specific process which can send valid user interface presentation requests; and
    determining if a request has been sent by one of said specific processes.

17. A system for managing the presentation of user interface data generated by a source, the system comprising:
    a computer comprising a processor and a memory in communication with the processor;
    a core experience module residing in the memory, the core experience module generating information renderable by a presenter; and
    an experience enforcement module residing in the memory, said experience enforcement module operably connected to said core experience module, said experience enforcement module receiving a request for performing actions, determining if said request is a user interface presentation request, determining the validity of said request if said request is a user interface presentation request, and providing said request to said presenter if said request is a valid user interface presentation request,
    wherein the experience enforcement module comprises a storage for storing one or more identities of at least one specific process which sends valid user interface presentation requests to said system,
    wherein the experience enforcement module further comprises a validity checker for determining if a request has been sent by one of said specific processes,
    wherein the experience enforcement module further comprises an experience enforcement validity data sender sending experience validity data relating to said core experience module and operably connected to said source;
    wherein the experience enforcement module further comprises a signed image of said core experience module; and
    if said request is a user interface presentation request, but said request is not a valid user interface presentation request, the experience enforcement module services said user interface presentation request without presenting user interface data by said presenter pursuant to said user interface presentation request by suppressing the user interface presentation request at the client without indicating to a user that the suppression has occurred, wherein suppressing the user interface presentation request comprises sending a first instruction to the client to cause a display area to be hidden and sending a second instruction to the client to cause audio user interface data to be rendered at a substantially zero volume level.

18. The system of claim 17, wherein said presenter comprises:
a video display.

19. The system of claim 17, wherein said presenter comprises:
an audio speaker.

20. The system of claim 17, wherein said core experience module and said experience enforcement module are located at a server, and wherein said presenter is 1

21. The system of claim 17, wherein, if said request is not a valid user interface presentation request, then said experience enforcement module generates a modified form of said request, and wherein said modified form is provided to said presenter.

* * * * *

UNITED STATES PATENT AND TRADEMARK OFFICE
CERTIFICATE OF CORRECTION

PATENT NO.       : 7,783,987 B2
APPLICATION NO.  : 10/903439
DATED            : August 24, 2010
INVENTOR(S)      : Vu X. Nguyen It is certified that error appears in the above-identified patent and that said Letters Patent is hereby corrected as shown below:

In column 14, line 6, in Claim 20, delete "1" and insert -- located at a client that is communicatively connected to said server. --, therefor.

Signed and Sealed this
First Day of February, 2011

David J. Kappos
*Director of the United States Patent and Trademark Office*